FOLDING BERTH

Original Filed April 14, 1948 4 Sheets-Sheet 1

INVENTOR.
ALBERT A. HOPEMAN, JR.
JOHN A. BOHNSACK
BY
Edward H. Rumpston
ATTORNEY

FOLDING BERTH

Original Filed April 14, 1948 4 Sheets-Sheet 2

INVENTOR.
ALBERT A. HOPEMAN, JR.
JOHN A. BOHNSACK
BY
Edward S. Rumpston
ATTORNEY

FOLDING BERTH

Original Filed April 14, 1948 4 Sheets-Sheet 3

INVENTOR.
ALBERT A. HOPEMAN, JR.
JOHN A. BOHNSACK
BY
Edward H. Rumpston
ATTORNEY

FOLDING BERTH

Original Filed April 14, 1948 4 Sheets-Sheet 4

INVENTOR.
ALBERT A. HOPEMAN, JR.
BY JOHN A. BOHNSACK

Edward H. Rumpf
ATTORNEY

United States Patent Office

Re. 24,457

Reissued Apr. 15, 1958

24,457

FOLDING BERTH

Albert A. Hopeman, Jr., Bronxville, N. Y., and John A. Bohnsack, Pottsville, Pa., assignors to Hopeman Bros., Inc., New York, N. Y., a corporation of Delaware Original No. 2,652,572, dated September 22, 1953, Serial No. 21,048, April 14, 1948. Application for reissue August 11, 1954, Serial No. 449,287

17 Claims. (Cl. 5—9)

Matter enclosed in heavy brackets [ ] appears in the original patent but forms no part of this reissue specification; matter printed in italics indicates the additions made by reissue.

This invention relates to folding berths, and more particularly, to the variety adapted for use in ship staterooms, railway Pullmans, and other locations where the available space is restricted or its conservation is desired, one object of the invention being to provide an improved folding berth of the above character having a more practical, safe and convenient character of construction.

Folding berths are known in which the berth is movably supported by pivotal mountings, linkage or the like, but such constructions have the disadvantage that the berth is subjected to inadvertent movement, particularly during adjustment between folded and extended positions, by the rolling or swaying of the ship or Pullman car, with danger of injury to the operator and to the equipment itself. Another object, therefore, is to provide such a berth having mechanism for moving it from one position to another comprising self-locking elements adapted to continuously hold the berth against movement except as deliberately adjusted by the operator.

Another object, in view of the frequent difficulty in providing skilled attendants, is to supply a berth capable of being easily and safely operated by a passenger for his own use.

A further object is to supply such a berth in a simple and reliable type of construction which is convenient to install and adapted to operate in a trouble-free manner for an indefinite period.

To these and other ends the invention resides in certain improvements and combinations of parts, all as will be hereinafter more fully described, the novel features being pointed out in the claims at the end of the specification.

Figures 3, 4:
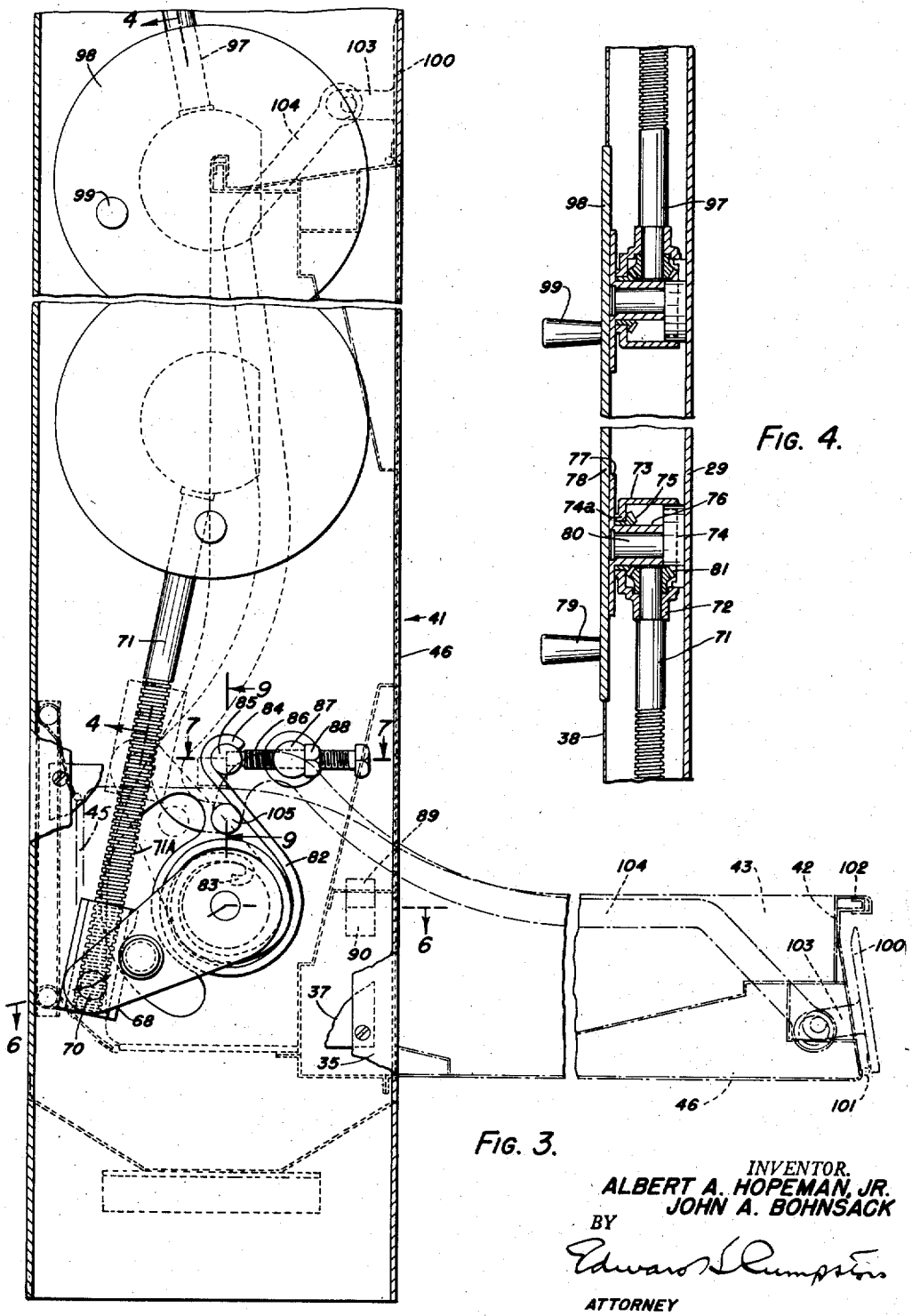
Fig. 3 is an enlarged end elevation of the lower portion of the supporting casing and lower berth, substantially as seen from the line 3—3 in Fig. 6, with parts broken away and partly in section to better illustrate the construction, the berth being shown in raised and lowered positions in full and dotted lines, respectively.
Fig. 4 is a sectional elevation on the line 4—4 in Fig. 3, partly broken away, showing portions of the operating mechanism.
Figures 5, 9, 10:
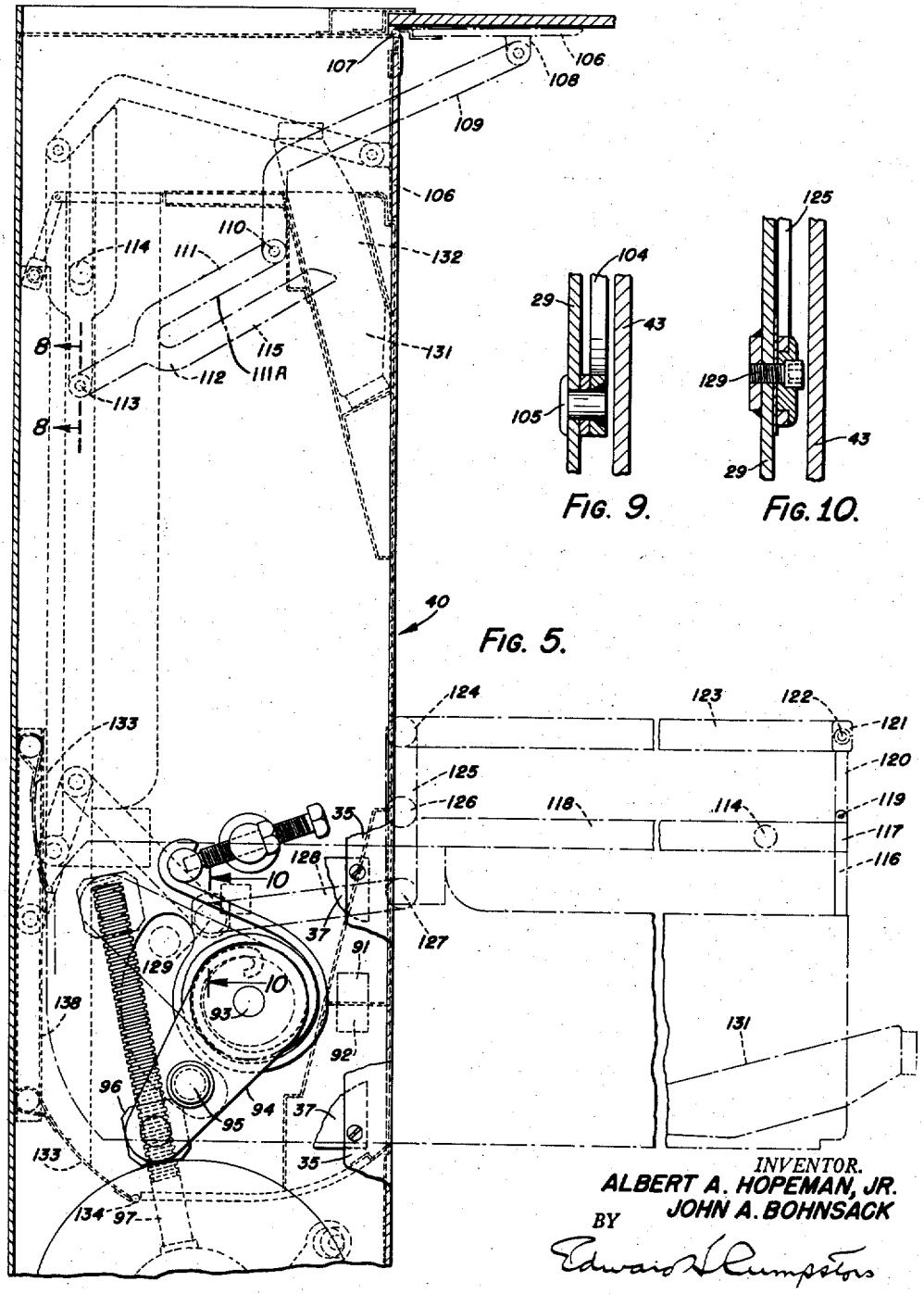
Fig. 5 is a view similar to Fig. 3, but showing the upper portion of the supporting casing and upper berth with the latter in raised and lowered positions shown in full and dotted lines, respectively, and partly broken away.
Figure 8:
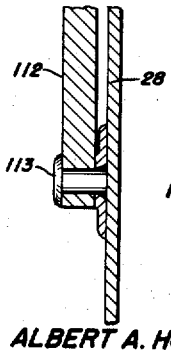

7—7 in Fig. 3, showing the means for adjusting the tension of the berth counterbalancing spring;

Fig. 8 is an enlarged sectional elevation substantially on the line 8—8 in Fig. 5, showing a pivotal support for linkage for operating a closure panel on the upper berth;

Fig. 9 is an enlarged, fragmentary, sectional elevation substantially on the line 9—9 in Fig. 3, showing the pivotal mounting of a link for actuating the closure panel of the lower berth, and Fig. 10 is a similar view on the line 10—10 in Fig. 5, showing the pivotal mounting of a link for actuating a guard rail mechanism on the upper berth.

Figure 1:
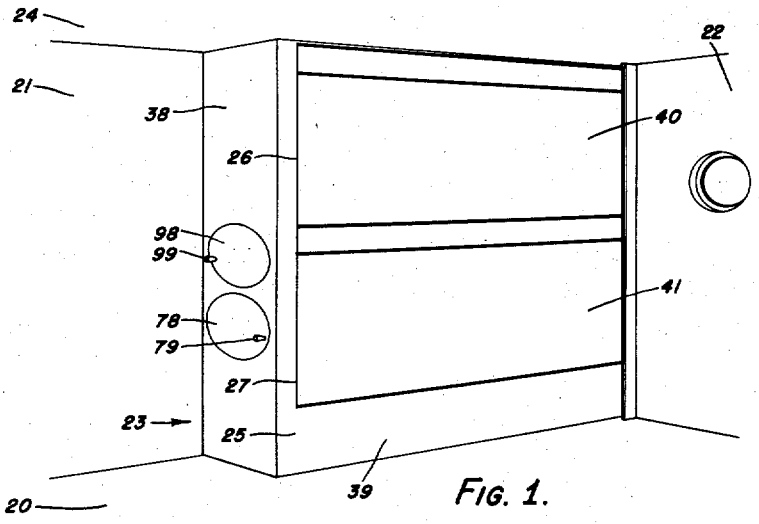
Fig. 1 is a perspective elevation of upper and lower berth equipment embodying the present invention and showing the berths in folded position.

The invention is embodied in the present instance, by way of illustration, in a unitary, upper and lower berth equipment (Figs. 1 and 2), shown on the deck 20 of a ship and against bulkheads, 21 and 22, thereof at their intersection. This berth equipment comprises supporting frame and casing means, indicated generally at 23, of generally rectangular, compact shape extending from the deck vertically into any suitable connection with the upper ceiling or deck 24. The front side 25 of the casing is formed with upper and lower berth receiving openings, 26 and 27, which are closed by the bottoms of the berth pans when in upwardly folded position, as hereafter described.

The supporting frame and casing means 23 comprises opposite end walls, 28 and 29 (Fig. 6), of metal plates of substantial thickness and strength to provide the main supports for the equipment. End wall 28 is formed with an outwardly turned stiffening and spacing flange 30 adapted to about a bulkhead and having thereon a housing 31 enclosing projecting journal means for the berth, as hereafter described. Wall 28 is formed at its rear with a flange 32 turned inwardly to enclose the berth parts. Wall 29 has at its rear a similarly inturned flange 33 and at its front side an outwardly extending flange 34 having its edge turned inwardly, as at 35. Fixed to its rear is a channel-shaped casing extension 36, corresponding generally to the front flange 34. A generally rectangular supporting plate 37, of substantial thickness and strength, is secured to the outer end 35 of the front flange 34 and to the outer arm of the rear channel 36 at each berth as shown, these plates being parallel with and spaced from the wall 29 and serving with the latter to support therebetween the main berth actuating parts, hereafter described. A closure plate 38 is provided and formed with marginal flanges fitting over the ends of front and rear flange portions 34 and 36, for forming therewith an enclosure for the berth actuating parts and providing a smooth outer wall surface for the outer end of the berth casing. The front flanges 30 and 34 of the walls 28 and 29 are connected beneath the lower berth by a flush portion 39 of the front wall of the casing, as shown.

Figure 6:
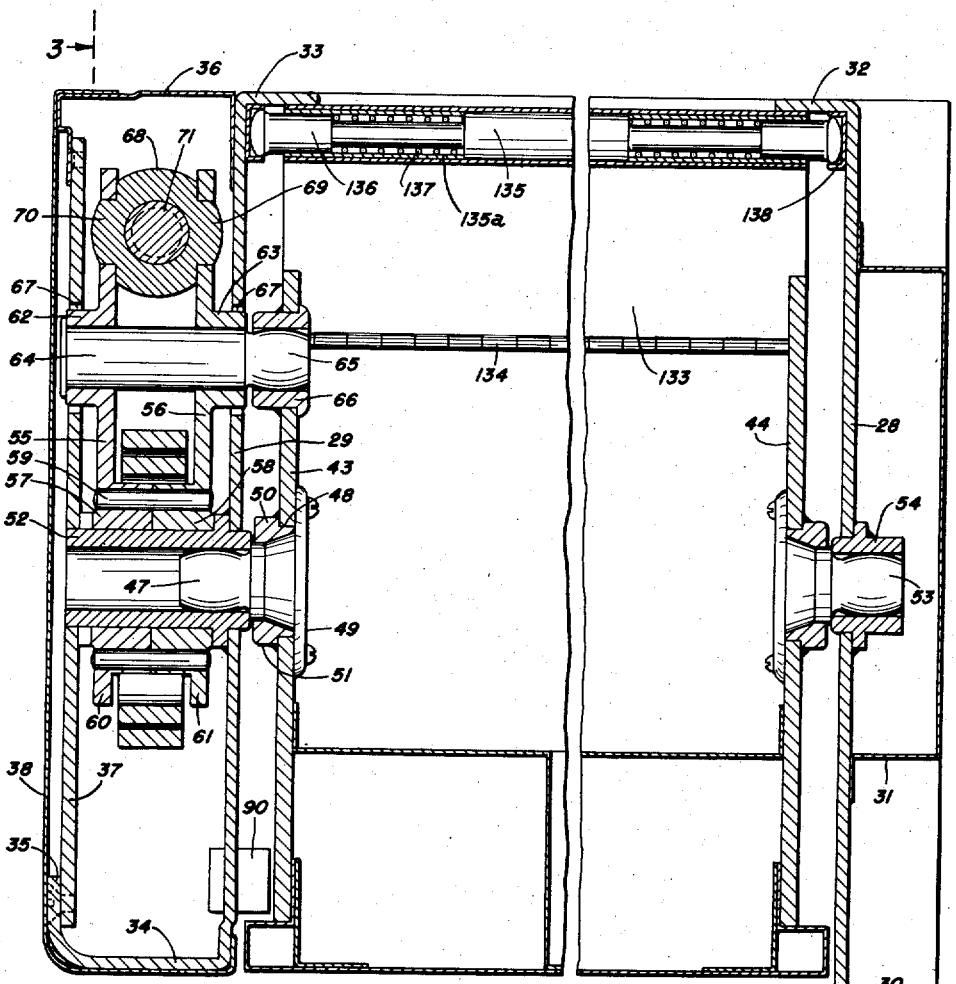
Fig. 6 is an enlarged sectional plan view on the line 6—6 in Fig. 3, partly broken away, and showing the parts with the berth in raised position.
Figure 7:
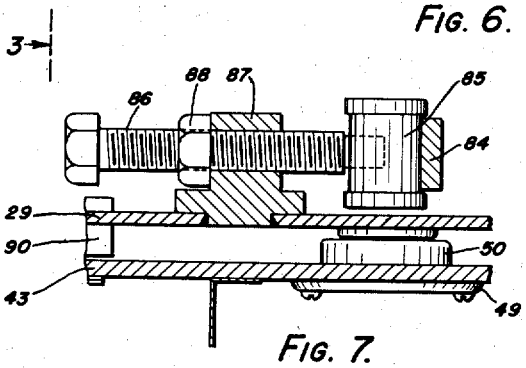
Fig. 7 is an enlarged sectional plan view on the line

Each of the upper and lower berths comprises a substantially rectangular sheet metal berth pan, 40 and 41, respectively, of generally similar construction, except as hereafter noted, so that a description of one will apply to both. Referring more particularly to the lower berth (Fig. 3), the pan comprises an outer side wall 42, end walls 43 and 44, a rear side wall 45 and a bottom wall 46. This pan construction may vary in its details of design, being strongly constructed and braced as shown in Figs. 3 and 6 to form a rigid structure with end walls 43 and 44, of sufficient thickness and strength to carry the mountings for pivotally supporting the berth between the casing walls 28 and 29.

The pivotal mounting for each berth preferably comprises a trunnion 47 at one end thereof, mounted in an opening 48 in the berth wall to which a flange 49 on the trunnion is fixed, with a bushing 50 on the trunnion fitted in its wall opening 48 and having a flange 51 engaging the side of wall 43 opposite the flange 49, to firmly anchor the trunnion to the berth wall. The outer end of the trunnion has a bearing engagement in the bore of a journal sleeve 52, the inner end of the journal being mounted in an opening in the frame wall 29. The journal 52 at one end of each berth, is extended outwardly through the space between the wall 29 and plate 37, the latter having therein an opening in which the outer end of the journal is secured. Such journal extensions serve to support parts of the berth actuating means, as hereafter described. The similar trunnion 53 at the opposite end of each berth is similarly supported for rocking movement in a short journal sleeve 54 fixed in an opening in wall 28, as shown.

The means for moving the berths between their folded and extended positions are the same for each, so that a description of such means for the lower berth will serve for both. This means comprises a pair of spaced arms, 55 and 56 (Fig. 6), having abutting hubs, 57 and 58, secured together by pins 59 and mounted to rock on the outward extension of journal 52. The arm hubs are provided with spaced flanges, 60 and 61, to form therebetween a spool-like portion on the hubs on which are coiled the counterbalance spring means hereafter described. Intermediate their hubs and outer ends, the arms have bosses, 62 and 63, bored to receive a pin 64 having its inner end 65 in bearing engagement in a bushing 66 fixed in an opening in the rear side of the adjacent end wall 43 of the berth. The frame wall 29 and plate 37 are formed with arcuate slots, as 67, concentric with the pivotal axis of the berth, in which the bosses 62 and 63 move with clearance and through the inner of which the pin 64 extends into engagement with the berth, as described.

The means for rocking the arms 55 and 56 preferably comprises an interposed *member or* nut 68 of generally cylindrical shape, but with its opposite sides partially flattened to leave cylindrical trunnions, 69 and 70, rocking or swiveling in bearing openings in the adjacent arms. *Drive means comprising a spindle 71 having threads 71A (Fig. 3) formed thereon threadedly engage the internal threads of member 68. The upper end of spindle 71 is* [Threadedly engaged in the nut is a spindle 71 having its upper end] rotatably supported in a bearing 72 in a gear box 73, one side of which is formed with a circular bearing opening supported for partial rotation on a bearing bracket 74 projecting horizontally from the wall 29 and formed with a trunnion-like, circular bearing (partly broken away for clearance) for engagement in the said bearing in gear box 73. At its opposite side, box 73 has an outwardly extending flange 74a formed with a bearing opening for the reception of the hub of a bevel gear 75, on which the housing may rock. Gear 75 is fixed to a cylindrical bearing sleeve 76 on a flange 77 fixed to a crank disc 78 having a crank handle 79. Sleeve 76 is rotatably supported on a trunnion 80 fixed in the bearing bracket 74. Gear 75 meshes with a bevel gear 81 fixed to the end of the spindle 71, and it is apparent from this construction that rotation of disc 78, by means of handle 79, serves to rotate sleeve 76 and gear 75 which rotates gear 81 and the spindle 71, while the latter is free to swivel bodily with the box 73 on the bracket 74 and gear 75, the gear 81 swiveling partially around gear 75.

By rotating crank handle 79, therefore, the lower berth may be moved between its folded position and its extended position of use, through the operating means described including the transmission of the operating force through the nut, as 68, and threaded spindle 71. Since no force exerted by the berth is capable of moving the nut on its spindle, this operating mechanism is fully self-locking against any inadvertent movement of the berth due to rolling or swaying of a ship or railway car. At the same time, a relatively low force is required to rotate the spindle to effect the desired movement of the berth.

The counterbalancing means is the same for both berths, comprising for the lower berth, for example, a spring 82 (Fig. 3) having its inner end 83 fixed in an opening in the hubs of the arms, 55—56, and coiled therearound with its outer end extended and reversely bent to form a hook, as at 84. This hooked outer end is engaged around a cylindrical block 85 mounted to swivel on one end of a bolt 86 threadedly engaged in an opening in a post 87 fixed in an opening in the frame wall 29 above the pivotal support of the berth. The spring is thus held under tension so as to tend to turn the arms 55—56 and thus counterbalance the weight of the berth and associated parts before it can reach the screw and nut and gearing for actuating the same, thereby reducing the operating force required. By rotating bolt 86 in its post, the tension of the spring may be varied, and the bolt is secured in adjusted position by means of a lock nut 88. Stop means are provided for additionally supporting the lower berth in its extended or lowered position of use, comprising stop blocks 89, fixed on the end of the berth in position to engage a stop bracket 90 on frame wall 29 in the extended or lowered position of the berth, so as to more positively support it in such position. The counterbalancing device for the upper berth 40 (Fig. 5) is of the same construction and the upper berth is provided with a similar stop block 91 for engagement with a stop bracket 92 on the frame.

The upper berth is raised and lowered by a mechanism of the same construction (Fig. 5) as described above in connection with the lower berth. Thus, the upper berth 40 is supported in the same way for the same movements about a pivotal axis 93, having a similar concentricially mounted pair of arms 94 connected with the berth by means of pin 95. The arms have swivelled therebetween a nut 96 of somewhat different shape but the same construction, threadedly engaged with a spindle 97 provided with the same means for rotating it as described above in connection with the lower berth and as shown in detail in the upper portion of Fig. 4. This means comprises a similar crank disc 98 and crank handle 99 by means of which the upper berth is raised and lowered independently of the lower berth, through the same self-locking operating means by which the berth is continuously held against any inadvertent movement in either position to which it may be moved and while being adjusted between such positions by means of the crank.

In the folded or raised position of each berth, the top of the berth pan lies somewhat below the top of the berth opening and means are provided for covering such space to form with the bottom of the berth pan a complete closure for the berth opening and a continuous and smooth front wall for the equipment. In the case of the lower berth, this supplemental closure panel is provided in the form of a closure plate or flap 100 (Fig. 3) hinged along its bottom edge at 101 to the lower outer corner of the berth pan 46 underneath a side rail 102 projecting from the top corner of the pan. Plate 100 carries at each end an arm 103 to which is pivotally connected a long link 104 extending along the outside of the corresponding end of the berth and having its other end curved and pivotally connected to a post 105 on the corresponding frame wall 28 or 29. Post 105 is mounted eccentrically and above the pivotal axis of the berth pan so that while plate 100 lies against the front side of the pan in its extended position, the link serves to swing the plate outwardly, as the berth is raised, until it lies in the plane of the bottom of the berth pan, as shown, thus forming, in effect, an extension of the bottom of the pan and completely closing the berth receiving opening in the wall of the equipment.

The upper berth is also provided with a closure panel in the form of a plate or flap 106 (Fig. 5), which, in this case, is hinged at 107 along its inner side to the top of the berth receiving opening. This plate has an arm 108 to which a link 109 is pivotally connected at its forward end, the other end of the link being pivoted at 110 to the outer end of one arm 111 of a fork 112 pivoted at 113 on the inside of the frame wall 28. The guard rail means on each end of the upper berth, as hereafter described, carries a lug 114 adapted, as the berth is folded, to pass above the outer end of the other tine 115 of the fork, engage [the] *a cam member 111A (Fig. 5) formed along the forward narrow edge of* tine 111 and swing the fork and link 109 to lower the plate 106 to complete the closing of the berth receiving opening. As the berth is lowered, the lug 114 engages the fork tine 115, swinging the fork forwardly and downwardly and raising the closure plate, as shown. By the means of such closure panels, the berth receiving openings may be made large enough to afford ample clearance for the upper sides of the berths as they are moved toward and from their upper or folded positions, notwithstanding some projection over the side of the berth pan of the mattress or its coverings. The provisions for automatic closing of these panels in the folded positions of the berths insure the maintenace, in such positions, of the complete closure and smooth appearance of the front wall of the casing.

It has been found desirable to pivot the upper and lower berths at relatively low elevations in the casing, to conserve space and position them conveniently for access in use. However, it has also been found desirable to maintain the bottom of the upper berth at a sufficient elevation above the lower berth to insure head room for the occupants of the latter, as well as to maintain similar head room between the upper berth and the top of the casing. It has been found desirable, also, in the closed positions of the berth, to provide ample clearance between the top of the upper berth and the top of the casing and between the top of the lower berth and the bottom of the upper berth to afford clearance, for example, for the ladder projecting from the top of the upper berth, bedding or other articles projecting inadvertently from the berths and the like. Furthermore, the berths are of limited width and such basic space requirements, in order to provide a continuous wall when the berth is closed, and a convenient and comfortable berth when it is open, have been a problem which has been solved by the provision of the closure flaps or plates 100 and 106, by means of which ample clearances are obtained, while the gaps left between the berths and the top of their casing openings are effectively closed. By this means, the berths are completely enclosed in the casing and the parts together maintain a neat and pleasing continuity of wall surface.

The upper berth is preferably safeguarded by guard rail means adapted to be partially collapsed when the berth is moved to folded position. Such means comprises posts 116 fixed on and extending upwardly from the berth pan and carrying the outer side rail 117 and the connected end rails 118 to which the lugs 114 are fixed. *End rails 118 are thus immovably fixed to the berth pan and move as a unit therewith. Rails 118 carry lugs 114 which strike against cam surfaces 111A on tine members 111 for moving closure plate 106 to closed position, concomitantly with the closure of the upper berth.* Pivoted to the corner posts, as at 119, are post extensions 120, carrying an outer side rail 121 and pivoted thereto, as at 122, a pair of end rails 123 having their rear ends pivotally connected at 124 to the ends of corresponding levers 125. Levers 125 are pivoted centrally at 126 to the lower rails 118 and have their other ends pivoted at 127 to the outer ends of links 128. The latter lie along the outer sides of the ends of the upper berth and are *pivotally* connected at 129 to the frame walls 28 and 29, respectively, eccentrically of the pivotal axis of the berth. *Thus, members 124—129 pivotally anchor the movable portions of the lee rail means to the adjacent casing walls.*

As the berth is raised, this linkage pulls the upper rails 121 and 123 inwardly and downwardly into a folded position which avoids interference with the rear wall of the casing, as shown in Fig. 5. As the berth is extended, the upper rails 121 and 123 are restored automatically to the raised position shown in Fig. 5 to safeguard the occupant of the berth.

Figure 2:
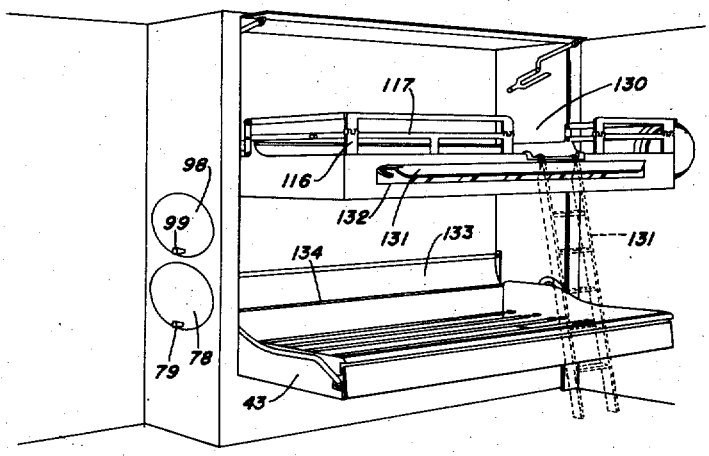
Fig. 2 is a similar view, but showing the berths extended in position for use.

This rail arrangement is preferably in the form of a separate unit at each end of the berth as best shown in Fig. 2, leaving an unobstructed interval 130 therebetween through which access may be had to or from the berth. For this purpose, also, the upper berth is preferably provided with a ladder 131 adapted to be received in a pocket 132 extending inwardly and downwardly through the outer side wall of the berth pan, as shown. When not in use, the ladder is compactly stowed away in this pocket, but may be conveniently removed and hooked over the outer edge of the pan with its feet resting on the floor, in position for use in ascending to the upper berth.

Each berth is preferably provided, also, along its inner side with means for preventing articles from falling between the berth and the rear wall of the casing. To this end, as best shown in Fig. 6, a sheet 133 of sheet metal or other suitably stiff material is hinged at 134 along its lower edge to the top of the rear wall of the lower berth pan, the opposite edge of this sheet or apron being secured around a rod 135 having at each end a sleeve extension 135a containing a telescopically sliding plunger 136 urged outwardly by a coiled spring 137. The outer ends of these plungers ride in vertical channel bars 138 carried on the frame walls 28 and 29 so as to lie closely adjacent the rear casing wall. This apron thus connects at all times the rear side wall of the berth pan with the casing in close proximity to its rear wall, so as to keep the space therebetween constantly closed. The upper berth is provided with a hinged apron having the same construction so that it need not be further described.

The operation of the equipment is evident from the above description. In folded position, the berths and their supporting structure and operating mechanism are fully and compactly enclosed in a casing which forms, in effect, a portion of the side walls of the compartment. In use, each counterbalanced berth may be readily lowered, with a minimum of effort, by turning its crank 79 or 99, so that the berth swings outwardly and downwardly to horizontal position in which it is securely supported by the mechanism and the stop means described. In such opening movement, the supplemental casing panels 100 and 106 are automatically opened and disposed in out-of-the-way positions and the guard rail means of the upper berth is automatically raised. Conveniently presented at the forward side of the upper berth is the ladder 131 which may be easily removed from its compartment and placed in position for use in reaching the upper berth. The inner side of each berth is safeguarded in all positions by an apron to prevent bedding or other articles from dropping or becoming wedged between the side of the berth and the rear wall of the casing.

These advantageous berth arrangements are adapted for convenient operation by the occupant or passenger himself, so as to obviate the necessity for operation by skilled attendants, and the berths are effectively controlled at all times by the self-locking character of the operating mechanism, so as to safeguard them against unintended movement by the rolling or swaying of the ship or railway car on which they are employed.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. In a folding berth structure, a supporting frame, a berth pan having opposite ends thereof mounted for pivotal movement on said frame, a pair of spaced arms mounted for pivotal movement on said frame concentrically with the pivotal mounting of said pan and fixed to each other, means connecting said arms to said pan for movement therewith, a nut mounted for swiveling movement between said arms, a spindle having one end thereof threadedly engaged in said nut, a mounting for pivotally supporting the other end of said spindle on said frame, and means for rotating said spindle to move said pan.

2. In a folding berth structure, a supporting frame, a berth pan having its opposite ends provided with trunnions, journals on said frame for supporting said trunnions, an arm pivotally mounted on one of said journals and connected to said pan for movement therewith, a nut mounted to swivel on said arm, a spindle threadedly engaged with said nut, mounting means on said frame pivotally supporting said spindle, and means for rotating said spindle to move said pan.

3. In a folding berth structure, a supporting frame, a berth pan provided with trunnions at opposite ends thereof, journals on said frame for supporting said trunnions, a pair of spaced arms pivotally mounted on one of said journals and fixed to each other, said arms being connected to and movable with said pan, a spring coiled about said journal between said arms and having one end connected to said arms and the other end adjustably connected to said frame, a nut mounted for swiveling movement on said arms, a spindle threadedly engaged with said nut, mounting means on said frame pivotally supporting said spindle, and means for rotating said spindle to move said pan.

4. In a folding berth, a supporting casing having a berth receiving opening in a side thereof, a berth pan movably connected with said casing for movement between a folded position thereon partially closing said opening and an extended position of use, a closure plate hinged to the outer side of said pan, and link means connected to said plate and casing for swinging said plate during folding movement of said pan to complete the closing of said opening and for retracting said plate against the outer side of said pan in the extended position thereof.

5. In a folding berth, a supporting casing having a berth receiving opening in a side thereof, a berth pan having its opposite ends pivotally mounted in said casing for movement to a folded position partially closing said opening and to an extended position of use, a closure plate hinged to the outer side of said pan, and link means connected to said plate and to said casing eccentrically of said pivotal mounting of said berth for swinging said plate in the folded position of said pan to complete the closing of said opening and for retracting said plate against the forward side of said pan in the extended position thereof.

6. In a folding berth structure, a supporting casing having an opening in a side thereof for receiving a berth pan, a berth pan mounted for movement in said casing between a folded position partially closing said opening and an extended position of use, a closure plate hinged to said casing at one side of said opening, link means connected to said plate and to said casing, and means on said pan for actuating said link means for swinging said plate to position for completely closing said opening in the folded position of said pan and to a raised position in the extended position of said pan.

7. A construction as specified in claim 6 in which said link means comprises a fork pivotally mounted on said casing, a link pivotally connected with said fork and with said plate and a lug on said pan for engaging and swinging said fork to swing said plate during movement of said pan.

[8. In a folding berth structure, a supporting casing having an opening in a side thereof for receiving a berth pan, a berth pan having its ends pivotally supported in said casing for movement to a folded position closing said opening and to an extended position of use, and an apron of relatively stiff material having one side edge thereof pivotally connected with the top of the rear wall of said pan, guide means at the ends of the opposite edge of said apron, and cooperating means on said casing engaging said guide means for guiding said opposite apron edge for sliding movement along said casing to continuously close the opening between said casing and pan wall.]

[9. A construction as specified in claim 8 in which said opposite apron edge is provided with spring actuated plungers in sliding engagement with channel-shaped means on said casing adjacent the opposite ends of said pan for guiding said opposite apron edge for sliding movement along said casing to continuously close the opening between said casing and pan wall.]

[10. In a folding berth structure, a supporting and enclosing casing formed with an opening for receiving a berth pan, a berth pan movably supported by said casing for movement from an upright folded position in said opening to a substantially horizontal position of use extending outside said casing means for moving said pan, said berth pan in folded position having its top located below the top of said pan opening to leave a gap therebetween and being arranged to close the remainder of said opening and a closure flap mounted for movement to position to close said gap when said pan is moved to folded position in said opening, to complete the closure of said opening.]

[11. In a folding berth structure, a supporting and enclosing casing formed with an opening for receiving a berth pan, a berth pan movably supported by said casing for movement between an upright folded position in said opening and a substantially horizontal position of use extending outside said casing, means for moving said pan, said berth pan in folded position having its top located below the top of said opening to leave a gap therebetween and being arranged to close the remainder of said opening, a flap for closing said gap, and means for moving said flap toward and from position for closing said gap as said berth pan is moved toward and from folded position in said opening, for completing the closure of said opening and maintaining the continuity of said casing and pan in the folded position of said pan.]

12. In a folding berth structure, a supporting casing having upper and lower openings in a side thereof for receiving berth pans, upper and lower berth pans having their inner sides pivotally mounted in said casing adjacent the bottoms of said openings, respectively, for movement between folded positions partially closing said openings and extended positions of use, respectively, said upper pan in folded position having its top located in spaced relation with the top of said casing to leave a gap therebetween and said lower pan in folded position having its top located in spaced relation with the bottom of said upper pan to leave a gap therebetween, flap means mounted for movement toward and from position for closing said gaps, respectively, and means *in said end wall structure connecting said structure and flap means and operated by the swinging movement of said pans* for moving said flap means toward and from positions for closing said gaps as said pans are moved toward and from folded positions, for completing the closure of said openings and maintaining the continuity of the side of said casing.

*13. In a berth structure, a supporting carrier structure having top and side walls, a berth pan pivotally mounted between the side walls to be swung downwardly into horizontal position or upwardly into stored vertical position with its bottom wall flush with the front of the top*

*and side walls of the carrier supporting structure, a front flap adapted to cover the space in the supporting structure between the front of the top wall and the upper end of the berth pan bottom when in stored position, means for pivotally mounting the flap to the top wall, means operable to swing said flap to and from closure position, means for automatically actuating said flap swing means to open the flap, and means projecting into the path of movement of said berth pan and operable thereby when moving to stored position for actuating the flap swinging means to close the flap.*

*14. In a berth structure, spaced supporting walls, upper and lower berth pans pivotally mounted in aligned relation on said walls and swingable into vertical stored relation between said walls or into horizontal prone position, said berth pans being spaced when in stored position, a flap for closing the space between said berth pans pivotally carried by the lower pan, and means connected to said flap and one of said walls for retaining said flap in substantially vertical position.*

*15. In a berth structure, spaced supporting end walls, upper and lower berth pans pivotally mounted in vertically aligned relation on said walls and swingable into vertical stored relation between said walls or into horizontal prone position partially outside of said walls, said berth pans being spaced vertically when in stored position, a flap for closing the space between said pans when in vertical stored position, hinge means connecting the flap to the bottom portion of the front side of the lower pan, and means connecting the flap with one of the walls and operative to retain the flap in substantially vertical position in any position of the pan.*

*16. In a berth structure, spaced supporting end walls, upper and lower berth pans pivotally mounted in vertically aligned relation on said walls and swingable into vertical stored relation between said walls or into horizontal prone position partially outside of said walls, said berth pans being spaced vertically when in stored position, a flap pivoted to the outside bottom portion of the front wall of the lower pan, and a link member pivoted to an end of said flap and to one of said walls for holding the flap in substantially vertical position regardless of the lower pan position.*

*17. A unitary bed structure comprising a housing having hollow end walls, a top wall and lower front wall, upper and lower berth pans between and pivotally mounted on said end walls, said pans being swingable into aligned vertical stored position between the end walls with their bottoms flush with the front surfaces of the housing and into horizontal position for occupancy, said pans being spaced when in stored position and the upper pan being spaced from the top wall when in stored positions, shiftable flaps for closing said spaces, and means operable by said pans for shifting the position of said flaps.*

*18. An actuator mechanism for swinging a pivotally mounted berth pan comprising a casing having fixed bearings, a driven member rotatably mounted on a casing bearing and having pan actuating arm means, a driven shaft mounted in a casing bearing, a drive shaft mounted in a casing bearing, a gear fixed on said drive shaft, a gear on said driven shaft meshing with the gear on said drive shaft, drive means fixed on said driven shaft meshing with said driven member, and a handle on said drive shaft operable to actuate said gearing.*

*19. A prefabricated unitary bed structure for a predetermined space in a room comprising a housing having hollow end wall structure, a top wall, an upper front wall and a bottom front wall, upper and lower berth pans between and pivotally mounted on said end wall structures, said pans being spaced vertically when moved to stored position and said upper pan being spaced from said upper front wall when in vertical stored position, gearing structures in one end wall structure operable to swing the berth pans into vertical stored position or horizontal position, flaps for closing the space between said berth pans and the space above the upper berth when in vertical position, and means in said end wall structure operated by swinging movement of the berth pans for actuating the flaps to close spaces between the berth pans and between the upper berth pan and the front top wall when the pans are swung to vertical stored position.*

*20. In a folding berth structure, a supporting and enclosing casing formed with an opening for receiving a berth pan, a berth pan pivotally supported by said casing for movement from an upright folded position in said opening to a substantially horizontal position of use extending outside said casing, means for moving said pan, said berth pan in folded position having its top located below the top of said pan opening to leave a gap therebetween and being arranged to close the remainder of said opening, and a closure flap mounted on said enclosing casing for movement to position to close said gap when said pan is moved to folded position in said opening, to complete the closure of said opening.*

*21. In a folding berth structure, a supporting and enclosing casing formed with an opening for receiving a berth pan, a berth pan pivotally supported by said casing for movement between an upright folded position in said opening and a substantially horizontal position of use extending outside said casing, means for moving said pan, said berth pan in folded position having its top located below the top of said opening to leave a gap therebetween and being arranged to close the remainder of said opening, a flap mounted on said enclosing casing for closing said gap, and means for moving said flap toward and from position for closing said gap as said berth pan is moved toward and from folded position in said opening, for completing the closure of said opening and maintaining the continuity of said casing and pan in the folded position of said pan.*

References Cited in the file of this patent or the original patent

UNITED STATES PATENTS

| | | |
|---|---|---|
| 242,961 | Nelson | June 14, 1881 |
| 251,489 | Ware | Dec. 27, 1881 |
| 403,850 | Merrill | May 21, 1889 |
| 547,607 | Gove | Oct. 8, 1895 |
| 562,269 | Auerbach | June 16, 1896 |
| 580,359 | Anthony | Apr. 13, 1897 |
| 773,606 | Tesch | Nov. 1, 1904 |
| 788,529 | Frank | May 2, 1905 |
| 1,160,399 | Giberson | Nov. 16, 1915 |
| 1,195,637 | Anderson | Aug. 22, 1916 |
| 1,278,108 | Cimini | Sept. 10, 1918 |
| 1,542,766 | Hall | June 16, 1925 |
| 1,846,824 | White | Feb. 23, 1932 |
| 2,016,119 | Owler | Oct. 1, 1935 |
| 2,056,246 | Bell | Oct. 6, 1936 |
| 2,139,253 | Bittner | Dec. 6, 1938 |
| 2,257,625 | Thomas | Sept. 30, 1941 |
| 2,295,006 | Philips | Sept. 8, 1942 |
| 2,373,018 | Dekert | Apr. 3, 1945 |
| 2,541,504 | Cudini | Feb. 13, 1951 |
| 2,550,599 | Reed | Apr. 24, 1951 |
| 2,650,370 | Cudini | Sept. 1, 1953 |

FOREIGN PATENTS

| | | |
|---|---|---|
| 7,455 | France | May 29, 1907 |
| 10,413 | Great Britain | 1887 |
| 505,341 | Germany | Aug. 18, 1930 |
| 929,008 | France | June 23, 1947 |